Aug. 4, 1931. F. H. BOGART 1,817,669
LOADING DEVICE FOR MACHINE TOOLS
Filed April 9, 1928 3 Sheets-Sheet 3
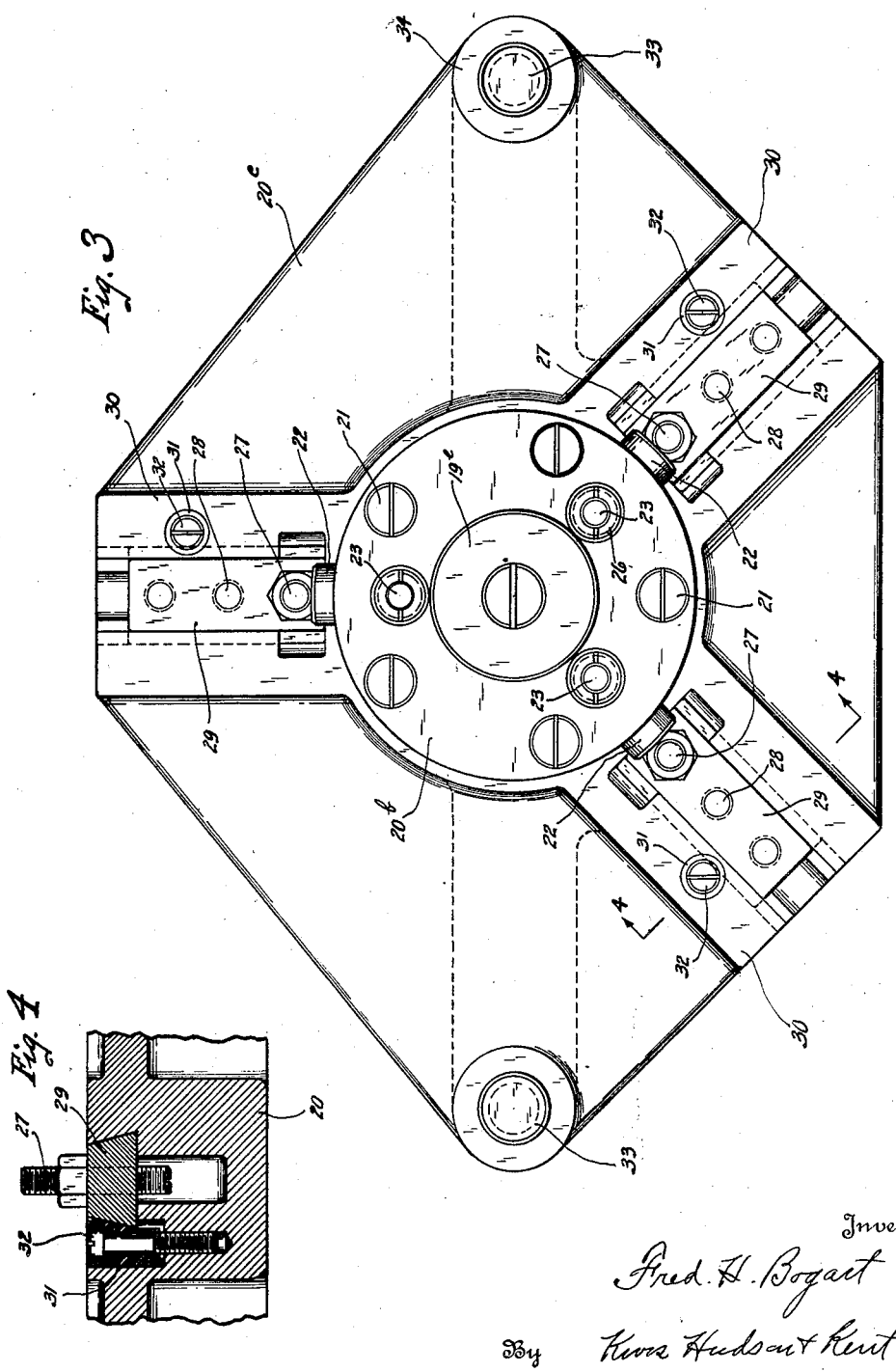
Inventor
Fred. H. Bogart
By Kerr, Hudson & Kent
Attorneys Patented Aug. 4, 1931

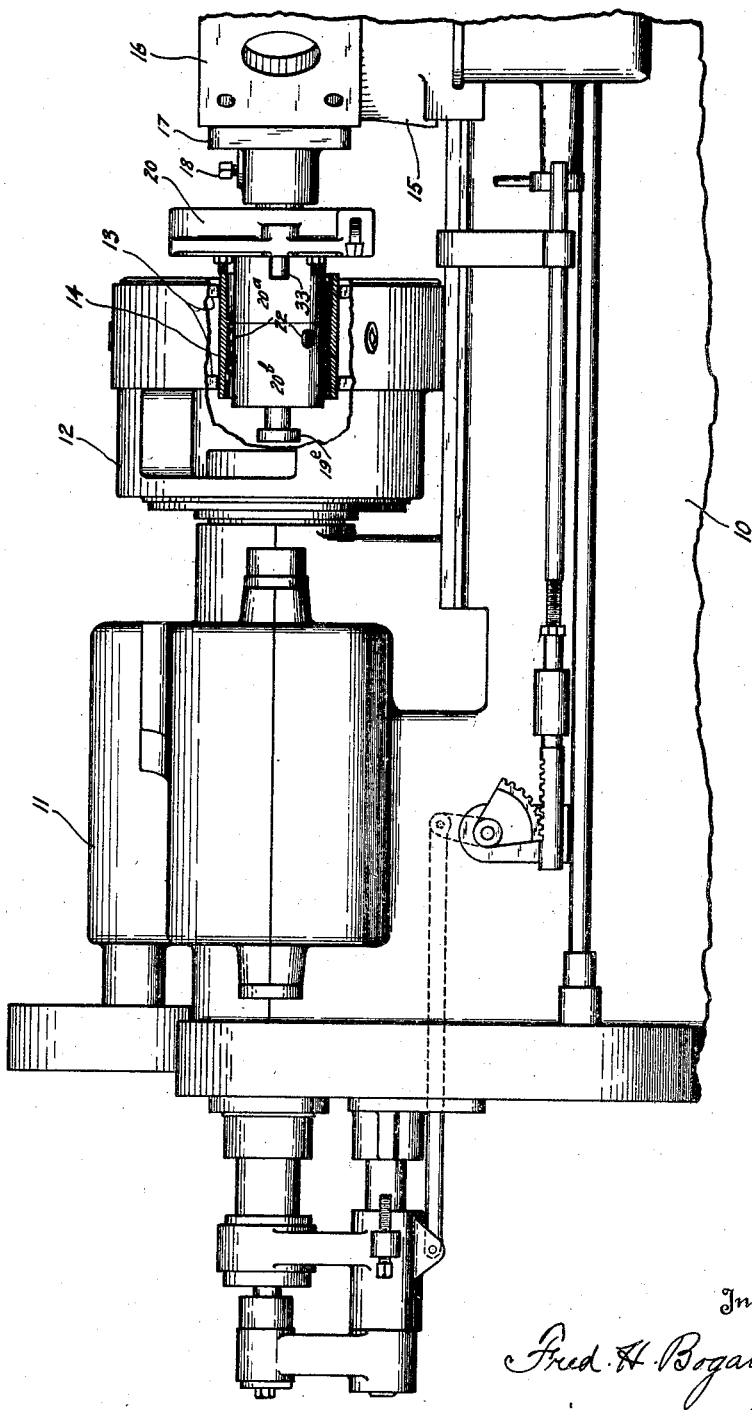

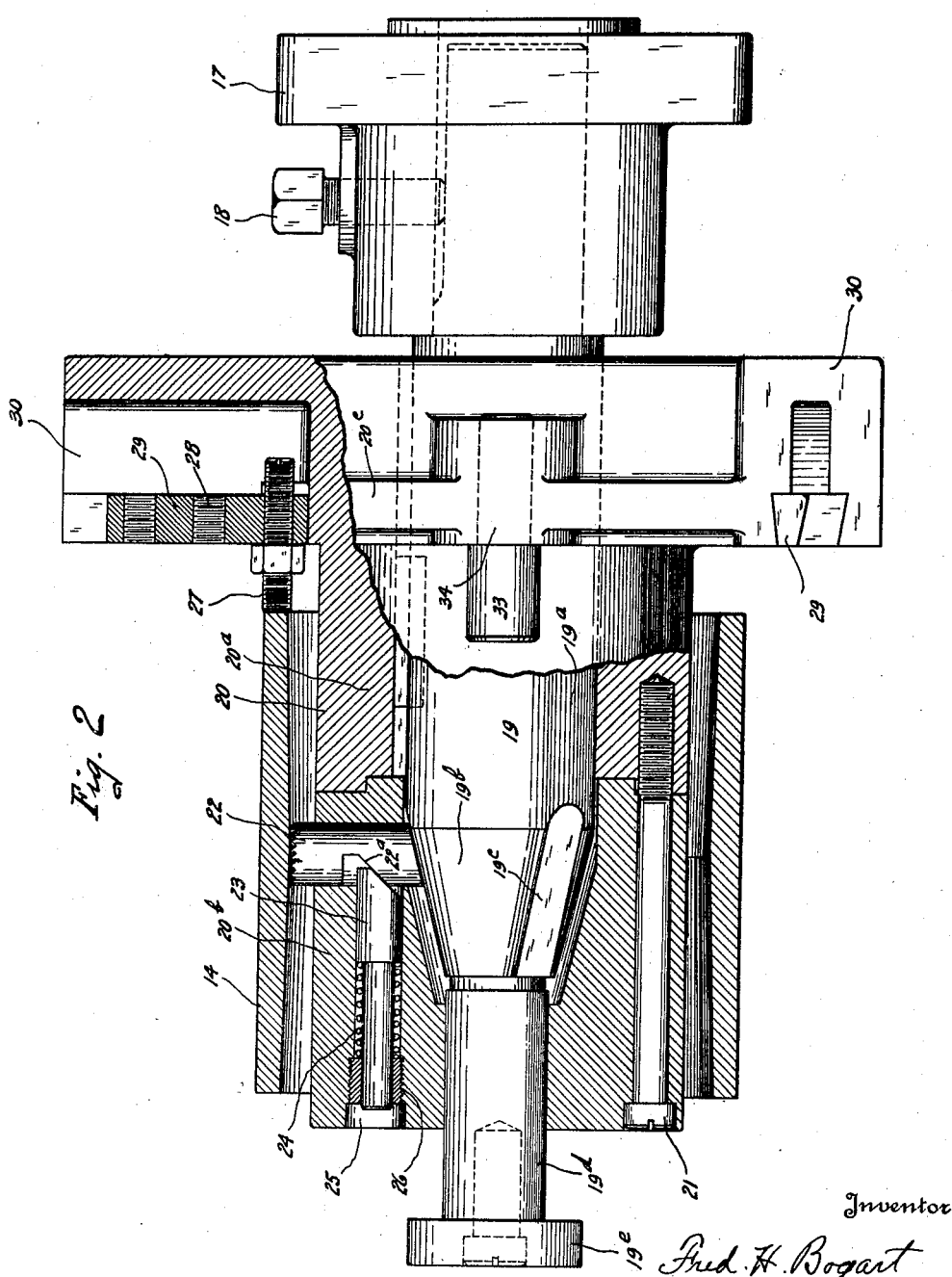

1,817,669

UNITED STATES PATENT OFFICE

FRED H. BOGART, OF CLEVELAND HEIGHTS, OHIO, ASSIGNOR TO THE WARNER & SWASEY COMPANY, OF CLEVELAND, OHIO, A CORPORATION OF OHIO

LOADING DEVICE FOR MACHINE TOOLS

Application filed April 9, 1928. Serial No. 268,443.

This invention relates to loading devices for machine tools and has for one of its objects to provide a loading device which presents a work piece to the work holding member and positions it correctly axially of the chuck and substantially centrally of the axis of rotation.

A further object is to provide a loading device of this character which enables the work piece to be positioned in a chuck or other work holder easily and quickly as well as accurately.

Still further the invention aims to provide a device of this character wherein the jaws of the loading device are automatically collapsed or retracted from the work piece after it has been engaged by the jaws of the work holder and when the loading device is moved away from the work holder. That is to say, it is one of the objects to do away with the necessity of a manual operation to collapse or retract the jaws and to provide for the automatic retraction of these jaws as soon as the loading device is moved away from the work holder following the gripping of the work piece by the jaws of the work holder.

A still further object is to provide a loading device having the above advantages and which is especially adapted for loading tubular work pieces, such as pipe coupling blanks, with additional advantages in the way of adjustments which adapt the device for blanks of widely differing diameters and lengths.

A further object is to provide a loading device especially adapted for loading hollow work pieces of some length, such as pipe couplings and the like, the loading device being arranged to so grip the work piece as to admit of an adjustment of the position of the work piece as the jaws of the chuck grip the same in the event that the work piece is not accurately formed, as by a non-coincidence of the axes of the inner and outer surfaces.

The above and other objects are attained by my invention which may be here briefly summarized as consisting in certain novel combinations and arrangements of parts and details of construction which will be described in the specification and set forth in the appended claims.

In the accompanying sheets of drawings wherein I have shown the preferred embodiment of the invention, Fig. 1 is a side view of the front or head portion of a machine tool which, in this instance, is a lathe, certain portions of the chuck being broken away and a coupling blank being shown in section; Fig. 2 is a view partly in elevation and partly in vertical section of the loading device detached from the turret on which it is shown mounted in Fig. 1; Fig. 3 is a front view of the loading device with the jaws in work gripping position, as in Fig. 2; and Fig. 4 is a detail sectional view substantially along the line 4—4 of Fig. 3.

The loading device as herein illustrated is designed for use on a machine tool for machining pipe coupling blanks and may be used to advantage as an attachment for coupling boring and threading machines such as disclosed in my prior applications Serial No. 89,518, filed February 20, 1926, and Serial No. 165,264, filed February 2, 1927. When utilized as an attachment for machines such as constitute the subject matter of my prior applications, it may be applied to one face of the turret on which are mounted the boring and threading heads. As a matter of fact, Fig. 1 of the drawings shows a portion of the machine illustrated in both of my prior applications referred to, although in this instance I have omitted the boring and threading heads and have illustrated only a portion of the turret to which the heads are adapted to be attached.

In the drawings, 10 represents a portion of the bed of a lathe and 11 represents the head which will be provided with a suitably driven work spindle to which is attached a chuck 12 having, in this instance, two sets of axially spaced jaws 13 which are adapted to engage the work piece here illustrated as a coupling blank 14, the machining operations of which include the boring and threading of the two halves of the coupling on opposite tapers and the facing and chamfering of the ends of the blanks. I may use to advantage and prefer to use a chuck such as illustrated in my prior application Serial No. 229,896, filed October 31, 1927, though the invention is limited neither to the chuck such as disclosed in my application last referred to nor in fact to lathes or machine tools such as disclosed in my two applications first referred to, since the invention is applicable to a wide variety of machine tools such as coupling boring and threading machines, horizontal and vertical boring mills and the like.

Slidable on the ways of the bed 10 toward and from the chuck 12 is shown a turret saddle 15 provided with a turret 16 which in this instance is adapted to support the boring and threading heads and is adapted to support also the loading device which will be applied to one of the faces of the turret.

This loading device, as here illustrated, includes an adapter 17 designed to be suitably secured to a support, in this instance the turret 16. Rigidly secured in this adapter, by means of a set-screw 18 or otherwise, is the inner member 19 or supporting member of the loading device. This member is in the main cylindrical in shape, the main or body portion 19$^a$ being cylindrical, but forwardly of the cylindrical portion is a tapered portion 19$^b$ provided with flat tapered cam-ways 19$^c$ and forward of the tapered portion is a reduced cylindrical portion 19$^d$ on the forward end of which is a shoulder formed by a removable cap or disk 19$^e$.

Slidable upon the cylindrical portions 19$^a$ and 19$^d$ of the inner or supporting member 19 is an outer sleeve-like member 20 which in this case consists of two parts 20$^a$ and 20$^b$, the former having sliding engagement with the cylindrical portion 19$^a$ of the inner member and the latter having sliding engagement with the reduced forward cylindrical portion 19$^d$ of the inner member. These two portions are secured together end to end by screws 21. The rear portion of the rear member 20$^a$ is flanged outwardly as illustrated at 20$^c$ in Figs. 2 and 3 for purposes to be referred to presently.

My improved loading and centering device includes, an addition to the inner or supporting member 19 and the sleeve-like member 20, a series of work engaging jaws 22 which are preferably and as herein illustrated three in number. These jaws are toothed or corrugated at their outer ends and are adapted to engage the inner wall of the coupling blank 14 about midway of the ends thereof, as best illustrated in Fig. 2. The arrangement of these jaws, circumferentially considered, is important, the preferred arrangement being that illustrated in Fig. 3 wherein one jaw is shown at the top of the loading device and two are arranged beneath it substantially 45° apart and each substantially 135° from the upper jaw. This arrangement has been found by practice to give very good results although I do not regard it as an essential feature of the invention.

The jaws 22 extend radially through openings provided in the forward portion 20$^b$ of the outer sleeve-like member 20 and their inner ends are tapered in accordance with the tapered faces or cam-ways 19$^c$ which the inner ends of the jaws constantly engage.

It will be obvious that when the outer sleeve-like member 20 is moved in on the inner member 19 toward the adapter the jaws will be cammed outwardly and when the member 20 is moved in the opposite direction the jaws will be retracted or will move inwardly as long as their inner ends are held in engagement with the cam-ways 19$^c$. To accomplish this last mentioned result, means are provided to positively move the jaws inwardly during this last mentioned movement of the member 20, the means illustrated consisting of sliding cam plungers 23 urged toward the jaws by springs 24, the forward ends of these plungers being tapered and engaging the tapered bases of slots or notches 22$^a$ formed in the jaws as clearly illustrated in Fig. 2. These plungers 23 are movable axially in axially disposed openings 25 formed in the forward portion 20$^b$ of the outer sleeve-like member 20, the outer portions of the openings receiving screw plugs 26 having bores or openings through which the forward ends of the plungers extend so as to be guided thereby, said screw plugs also forming abutments for the springs 24.

Accordingly, when the outer member 20 is slid on the inner supporting member 19 toward the adapter 17, the jaws are cammed outwardly so that they may engage the work piece and when the outer member 20 is slid in the opposite direction or away from the adapter the jaws are automatically retracted or cammed inwardly by the spring actuated plungers 23.

In the use of this loading device, the coupling blank 14 or other hollow work piece is moved axially over the outer sleeve-like member 20, the forward end of which is at such time against the shoulder 19$^e$, the jaws 22 then being retracted. The work piece is thus moved inwardly until its inner end engages a suitable number of abutments 27 the position of which determines the extent of the movement of the work piece over the member 20. After the work piece engages these abutments, continued further movement of the work piece pushes the sleeve-like member 20 inwardly toward the adapter, causing the jaws 22 to move outwardly and to engage the inner wall of the work piece. When the work piece is thus moved inwardly until it engages the abutments and is next engaged by the jaws 22, it will be gripped and firmly held on the loading device, and, therefore, when the loading device is brought up to the chuck for loading the work piece and when in the final stage of the loading operation the outer surface of the work piece is engaged by the jaws of the chuck, it will be centered in the chuck providing the inner opening or bore is concentric with the outer surface and square with the end which engages the abutments. However, at times, the axis of the bore of the coupling or other work piece is not concentric with the outer surface nor square with said end, inasmuch as work pieces of the type contemplated herein are usually forgings or castings. In that event the work piece may be rocked somewhat about the central gripping jaws 22 of the loading device, when the jaws of the chuck come into gripping engagement with the opposite end portions of the outer surface of the work piece so as to centralize the outer surface at both ends. This rocking occurs by reason of the fact that the two sets of jaws of the chuck move inwardly at the same rate and tend to grip the work piece equally at both ends.

It should be noted that this rocking of the work piece while held by the jaws 22 of the loading device is permitted by reason of the fact that the jaws 22 engage the surface of the bore of the work piece midway between its ends. In this way, or by reason of the construction described, whether or not the inner bore of the work piece is concentric with the outer surface, the work piece will be so positioned that the outer surface becomes substantially concentric with the axis of the chuck and it will be held or gripped substantially equally by all the chuck jaws.

The abutments 27 are preferably adjustable both axially and radially and are preferably in the form of adjustable screw studs which may be mounted in any one of a series of openings 28 provided in adjustable slides 29 arranged in suitably spaced, radially extended thickened portions 30 of the flange-like portion 20° of the outer member 20. In this instance there are three of these adjustable abutments 27 which are preferably arranged one in line with each of the jaws 22. The abutments 27 are adjusted so as to project forwardly equal distances from the supporting slides 29 and their forward ends which are adapted to be engaged by the hollow work piece 14 lie in a plane which is at right angles to the axis of the loading device. Accordingly, when the work piece is brought up against these three abutments it will be held substantially square with reference to the axis of the loading device and when the jaws engage the work piece the latter will be supported on the loading device with the axis of its bore coinciding with the axis of the loading device, assuming that the end of the work piece is in a plane at substantially right angles to the bore.

The adjustability of the abutments in two directions is to adapt the loading device for work pieces of different lengths and diameters. If the length only of the work pieces varies, the abutments will be adjusted axially in or out, as the case may be, so that the jaws will engage the work piece at about its center but if the diameter only or the diameter and length of the work pieces vary they will be adjusted radially either in or out to suit any particular diameter. This can be done by either placing the screw studs in different openings 28 of the slides 29 or by adjusting the position of the slides or by doing both. In this way, the studs can be adjusted very accurately.

Different means may be provided for clamping the slides 29 in any position of adjustment, but, in this instance, as shown in Fig. 4, each of the slides 29 is clamped in position by a clamping block 31 which is adapted to be moved or forced inwardly by a clamping screw 32, the block, in this instance, being of a sleeve-like from and having a flattened tapered side, as illustrated, which engages one of the tapered sides of the slide.

For work pieces of widely differing diameters, it is desirable to use jaws 22 of different lengths, the longer jaws being employed for the work pieces of larger diameters. It is desirable also that the jaws, regardless of their length, have a substantial bearing in the forward portion 20$^b$ of the outer member 20 of the loading device, it being remembered that these jaws are adapted to slide axially in openings provided in the forward portion of the member 20. Accordingly when the length of the jaws is changed the forward portion of the member 20 is replaced by one having a greater or less diameter, as the case may be, so as to provide the necessary bearing or support for the jaws 22. For this purpose, i. e., for convenience in changing the jaws and for adapting the fixture for a larger or smaller diameter of work piece, the outer member 20 is made in two parts as illustrated.

After the work piece has been positioned on the loading device, as explained above, and this may be done while another work piece is being machined, the turret will be indexed so that the loading device with its work piece will project toward the chuck and then the saddle 15, with the turret 16 and loading device, is moved, generally with a quick motion toward the chuck or other rotatable work holder. In practice, the work piece is brought up with a quick motion until it is near its proper position in the work holder and then the power movement of the saddle is stopped and the saddle is moved forwardly the remainder of the distance by manually operated means. To determine the correct position axially of the work holder, one or more stops are provided in this instance on the loading device, which stops are adapted to engage the front face of the work holder.

These stops are in the form of studs 33 which are mounted in bosses 34 in the flange-like portion $20^c$ of the outer member 20 near the opposite sides thereof and preferably equal distances from and in line with the axis of the loading device to square the loading device with the face of the chuck. In practice the length of the stops or abutments 33 and the position of the forward ends of the abutments 27 are such that the stops or abutments 33 will engage the face of the chuck and thus stop the forward movement of the loading device with the work piece projecting substantially equal distances beyond the front and rear faces of that portion of the chuck carrying the two sets of jaws 13. When thus positioned axially of the chuck, the work piece is properly held with reference to the tools which are given a set-up for a work piece positioned in the chuck in the manner stated above.

As soon as the loading device with the work piece is positioned with relation to the chuck, as described above, the jaws of the chuck are moved inwardly so as to grip the work piece, this being done either by manual or power operation of the jaws of the chuck. Then the saddle 15 is moved away from the chuck generally by applying the quick return motion mechanism of the machine. When this occurs, the outer member 20 is temporarily held stationary, the inner member 19 then moving backward through it, resulting in the retraction of the jaws 22 of the loading device from the work piece. This movement of the inner member 19 relative to the outer member 20 continues until the shoulder $19^e$ provided at the forward end of the inner member 19 engages the forward end of the member 20 of the loading device. At this time the jaws are completely withdrawn or retracted by the camming action of the plungers 23 and the parts of the loading device now move back in unison or as a unit and the loading device is ready for the next loading operation.

After the work piece has been loaded into the chuck, as explained above, the operator indexes the turret so as to align the boring head with the work piece, the loading device, by such movement of the turret, being swung laterally so that the operator may position a new work piece on the loading device while the work piece in the chuck is being machined.

Thus it will be seen that the principal objects of the invention stated in the early part of the specification are attained since the work piece can be positioned on the loading device and loaded in the work holder or chuck in proper position therein both with respect to the axis of rotation and in an axial direction, the whole loading operation being effected accurately, easily and quickly, especially as no manual operation is required and no time is lost in retracting the jaws of the loading device from the work piece.

While I have shown the preferred construction, I do not desire to be confined to the precise details illustrated and described but aim in my claims to cover all modifications which do not involve a departure from the spirit and scope of the invention.

Having thus described my invention, I claim:

1. A machine tool having a loading device with provision for gripping a work piece midway between its ends whereby the work piece may rock while being held by the gripping means, a work holder adapted to receive the work piece from the loading device and having two sets of gripping means for gripping the work piece adjacent its ends, and means for causing a relative movement between the loading device and work holder to present a work piece to the latter.

2. In a machine tool for machining hollow work pieces with inner and outer surfaces, a loading device having means for gripping a work piece on one surface substantially midway between the ends thereof whereby the work piece may rock while being held by the gripping means, a work holder adapted to receive the work piece from the loading device and having means for gripping the work piece on its other surface adjacent opposite ends thereof, and means for causing a relative movement between the loading device and work holder to present a work piece to the latter.

3. In a machine tool, a loading device having means for gripping a hollow work piece on its inner surface substantially midway between the ends thereof whereby the work piece may rock while being held by the gripping means, a work holder adapted to receive the work piece from the loading device and having means for gripping the work piece on its outer surface adjacent opposite ends thereof, and means for causing a relative movement between the loading device and work holder to present a work piece to the latter.

4. A machine tool having a loading device with a single set of jaws for gripping a work piece substantially midway between the ends thereof whereby the work piece may rock while being held by the jaws, a work holder adapted to receive the work piece from the loading device and having two sets of jaws for gripping the work piece adjacent its ends, and means for causing a relative movement between the loading device and work holder to present a work piece to the latter.

5. A machine tool having a work holder adapted to engage a work piece externally thereof, a loading device movable toward and from the work holder comprising a support, a member surrounding and movable lengthwise of the support and having work engaging means movable inwardly and outwardly and controlled by the movement of said member, said work engaging means being movable outwardly to work engaging position and being adapted to grip a hollow work piece internally thereof.

6. A machine tool having a work holder adapted to engage a work piece, a loading device movable toward and from the work holder comprising a support, a member surrounding and movable longitudinally thereof, and work engaging jaws adapted at their outer ends to engage the work and movable inwardly and outwardly as said member is moved longitudinally of the support.

7. A machine tool having a work holder adapted to engage a work piece, a loading device movable toward and from the work holder comprising a support, a member surrounding and movable longitudinally of said support and provided intermediate its ends with radially projecting jaws adapted to be moved inwardly and outwardly as said member is moved lengthwise of the support and at their outer ends having work engaging portions.

8. A machine tool having a work holder adapted to engage a work piece, a loading device movable toward and from the work holder comprising a support having a cam portion, a sleeve-like member movable lengthwise of the support and provided with work engaging jaws whose inner ends engage the cam portion of the support.

9. In a device for loading a hollow member in a work holding device of a machine tool, a central support, and a member slidable thereon and provided with work engaging jaws, said slidable member having abutments adapted to be engaged by the end of the hollow member to move said sliding member longitudinally of the support.

10. In a device for loading hollow members in a chuck or the like, a central supporting member, a member slidable axially thereon and provided with radially movable jaws for engaging the interior of the hollow member and with abutments adapted to be engaged by the end of the hollow member to move the slidable member axially of the support, said support having cam means for camming the jaws outwardly when the sliding member is so moved.

11. In a device for loading hollow members in a chuck or the like, a central supporting member, a member slidable axially thereon and provided with radially movable jaws for engaging the interior of the hollow member and with abutments adapted to be engaged by the end of the hollow member to move the slidable member in a direction axially of the support, said support having cam means for camming the jaws outwardly when the sliding member is so moved, and means for retracting the jaws when said slidable member is moved on the support in the opposite direction to that stated.

12. In combination with a work holder having means for engaging the exterior of a hollow work piece, a loading device having a member movable toward and from the work holder and having jaws engageable with the interior of the work piece while the latter is being presented to the work holder, and means for causing said last mentioned jaws to be automatically retracted from the work piece when the latter is engaged in the work holder and said member of the loading device is moved away from the latter.

13. The combination of a work holder and a loading device, one movable toward and from the other, said loading device comprising a supporting member, a second member movable thereon, and work engaging jaws carried by said second member and adapted to engage the interior of a hollow work piece and movable inwardly and outwardly by the second member's movement on the supporting member.

14. The combination of a work holder and a loading device relatively movable toward and from each other, said loading device comprising a supporting member, a sleeve-like member movable longitudinally thereon, and work holding jaws which are movable laterally outward when the sleeve-like member is moved toward the inner end of the support and are moved laterally inward when the sleeve-like member is moved toward the outer end of the support.

15. A machine tool having a work holder and a loading device relatively movable toward and from each other, said loading device having jaws for engaging the work piece while the same is being presented to the work holder and having an abutment for engaging the work holder to properly position the work piece in the work holder axially thereof.

16. A machine tool having a rotatable work engaging chuck, a slide movable toward and from the chuck, said slide having a loading device with jaws for engaging the work piece while the latter is being presented to the chuck and having one or more abutments for engaging the chuck to limit the movement of the slide toward the chuck in the loading operation.

17. A machine tool having a rotatable work holder and a slide movable toward and from the work holder and provided with a loading device, said loading device being adapted to receive a hollow work piece and comprising a supporting member, jaws movable inwardly and outwardly and engageable with the interior of the work piece, a member slidable on the supporting member and controlling the inward and outward movement of the jaws, the slidable member having one or more abutments engageable by the end of the work piece and having one or more abutments engageable with the work holder.

18. A loading device for machine tools having jaws for engaging the body of the work piece and having one or more adjustable locating abutments independent of the jaws and positioned outwardly of the center of the device for engagement with the end of the work piece.

19. A loading device for machine tools having jaws movable inwardly and outwardly for engaging the body of the work piece and provided with locating abutments adapted to be engaged by the end of the work piece, and members carrying said abutments and adjustable inwardly and outwardly with reference to the axis of the loading device.

20. A loading device for machine tools comprising a supporting member, and a member thereon and having a removable portion provided with jaws movable inwardly and outwardly, said second member being movable on the first member to actuate the jaws.

21. A loading device for machine tools comprising a supporting member, and a sleeve thereon, said sleeve having a removable portion provided with radially movable jaws and being axially movable on the supporting member to actuate the jaws.

In testimony whereof, I hereunto affix my signature.

FRED H. BOGART.